United States Patent [19]

Tokui et al.

[11] Patent Number: 5,131,674
[45] Date of Patent: Jul. 21, 1992

[54] LUBRICANT FOR SKIS

[75] Inventors: Yasuyuki Tokui, Takatsuki; Isao Tanaka, Kobe; Takuo Morimoto, Kyoto; Sachio Ohtoshi, Zushi; Masaru Yamauchi, Yokohama, all of Japan

[73] Assignees: Asahi Glass Company Ltd., Tokyo; Asics Corporation, Kobe City, both of Japan

[21] Appl. No.: 588,848

[22] Filed: Sep. 27, 1990

[30] Foreign Application Priority Data

Sep. 29, 1989 [JP] Japan ................... 1-251781
Nov. 15, 1989 [JP] Japan ................... 1-294829
Nov. 15, 1989 [JP] Japan ................... 1-294830
Nov. 15, 1989 [JP] Japan ................... 1-294831
Nov. 15, 1989 [JP] Japan ................... 1-294832

[51] Int. Cl.$^5$ .................. C10M 173/02; C09K 5/00
[52] U.S. Cl. ........................ 280/610; 252/25; 252/29; 252/54; 280/600
[58] Field of Search ................ 252/25, 29, 54; 280/600, 610

[56] References Cited

U.S. PATENT DOCUMENTS

| | | | |
|---|---|---|---|
| 17,553 | 10/1891 | Ketchum | 252/25 |
| 3,856,686 | 12/1974 | Sato et al. | 252/24 |
| 4,500,678 | 2/1985 | Kita et al. | 252/29 |
| 4,836,944 | 6/1989 | Tohzuka et al. | 252/54 |
| 4,845,268 | 7/1989 | Ohsaka et al. | 252/54 |

FOREIGN PATENT DOCUMENTS

| | | |
|---|---|---|
| 0132879 | 7/1984 | European Pat. Off. |
| 0293864 | 6/1988 | European Pat. Off. |
| 0303055 | 7/1988 | European Pat. Off. |
| 0340636 | 8/1989 | European Pat. Off. |
| 2637907 | 4/1990 | France |
| 0660018 | 3/1987 | Switzerland |
| 2004534 | 9/1978 | United Kingdom |

OTHER PUBLICATIONS

Patent Abstracts of Japan, vol. 8, No. 56 (C-214) [1493], 14th Mar. 1984; & JP-A-58 210 981 (Central Glass K.K.) Dec. 8, 1983 *Abstract*.

Patent Abstracts of Japan, vol. 4, No. 113 (C-21) [595], 13th Aug. 1980; & JP-A-55 71 796 (Ogasaka Sukii Seisakusho K.K.) Jun. 30, 1980 *Abstract*.

*Primary Examiner*—Brian E. Hearn
*Assistant Examiner*—M. Nuzzolillo
*Attorney, Agent, or Firm*—Oblon, Spivak, McClelland, Maier & Neustadt

[57] ABSTRACT

A lubricant for skis, which comprises a fluorine compound containing a polyfluoroalkyl group and having a melting point of at most 100° C., wherein the fluorine compound is at least one member selected from the group consisting of an alcohol containing a polyfluoroalkyl group, an ester containing a polyfluoroalkyl group and a polyfluoroalkyl ester polymer of (meth)acrylic acid.

12 Claims, No Drawings

LUBRICANT FOR SKIS

The present invention relates to a lubricant for skis. More particularly, the present invention relates to a lubricant for skis comprising a fluorinated compound having a specific melting point and a polyfluoroalkyl group, and a lubricant for skis comprising a specific fluorinated compound and paraffin wax, which are designed to be coated and spread on ski soles to improve the sliding properties.

Heretofore, lubricants to be coated on the ski soles to improve the sliding properties have been known. For example, as lubricants of this type, paraffin waxes such as aliphatic hydrocarbons, polyfluoroalkanes, etc. have been commercially available. These lubricants are designed to be preliminarily heat-melted and uniformly coated and spread on the ski soles by a heat source such as an iron. As is well known, in the alpen ski competition, skiers compete for 1/100 seconds. Therefore, use of a lubricant to be coated on the ski soles is essential to shorten the descending time.

However, the above-mentioned paraffin waxes which have been used as lubricants for skis, are known to receive a stain during sliding or to undergo a deterioration of the performance due to an oxidation reaction, and they have a problem in maintaining the high speed decent. In an attempt to overcome such a problem, a fluorine type ski wax composed of a polyfluoroalkane has been proposed (Japanese Unexamined Patent Publication No. 58496/1985). However, this has created another problem.

Namely, this proposes to use as a lubricant a solid perfluorocarbon ($C_{2n}F_{2n+2}$) having a relatively high melting point produced from a halogenated perfluorocarbon sulfonyl ($C_nF_{2n+1}.SO_2F$) as the starting material. As is apparent from its molecular structure, this is a complete polyfluoroalkane composed of carbon and fluorine having no hydrocarbon, hydroxyl or ester groups at the molecular terminals. Lubricants for skis are usually required to strongly adhere to the sliding surfaces of the skis i.e. to ski soles usually made of a high density polyethylene and to improve the non-wettability. However, the above polyfluoroalkane does not provide adequate adhesive strength. Further, since the melting point is relatively high at a level of at least 100° C., it is necessary to heat to a high temperature at the time of coating, and this heat is likely to lead to a heat degradation of the high density polyethylene, whereby the sliding properties tend to be lowered. Further, even when the abovementioned polyfluoroalkane is directly coated without heat-melting at a high temperature, or even if such a polyfluoroalkane is dissolved in a solvent so that the solution is coated, it is impossible to attain satisfactory sliding properties.

Further, these paraffin waxes or polyfluoroalkanes are inadequate also with respect to the adhesion to ski soles (this is an important property to provide lubricating properties consistently for a long period of time) and the hardness of the lubricated surface (this is an important property against hard snow or durability against hard snow crystals), whereby it is impossible to attain the desired lubricating properties consistently. If the lubricant for skis fails to firmly adhere to the ski soles to form a hard lubricating surface, the lubricating surface tends to be broken or pealed in a short period of time, whereby the desired lubricating properties can not be attained.

The present invention has been made in view of such drawbacks of the conventional lubricants for skis. It is an object of the present invention to provide a lubricant for skis of a fluorine compound type having a specific melting point and a polyfluoroalkyl group, which is capable of imparting excellent sliding properties and which can be coated on the sliding surfaces of the skis at a low temperature, and to provide a lubricant for skis comprising a specific fluorine compound and a paraffin wax, which is excellent in the lubricating properties, the heat resistance or the economical advantage.

The present invention provides a lubricant for skis, which comprises a fluorine compound containing a polyfluoroalkyl group and having a melting point of at most 100° C., wherein the fluorine compound is at least one member selected from the group consisting of an alcohol containing a polyfluoroalkyl group, an ester containing a polyfluoroalkyl group and a polyfluoroalkyl ester polymer of (meth)acrylic acid.

Present invention also provides a lubricant for skis, which comprises:

(i) at least one fluorine compound selected from the group consisting of an alcohol containing a polyfluoroalkyl group, and ester containing a polyfluoroalkyl group, a (meth)acrylic acid ester polymer containing a polyfluoroalkyl group and fluorinated graphite, and (ii) at least one member selected from the group consisting of paraffin wax and a polyfluoroalkane.

Now, the present invention will be described in detail with reference to the preferred embodiments.

The alcohol containing a polyfluoroalkyl group of the present invention may be an alcohol containing a polyfluoroalkyl group of the formula (1):

$$Rf.R_1.OH \qquad (1)$$

wherein Rf is a polyfluoroalkyl group having from 4 to 20 carbon atoms, and $R_1$ is a bivalent hydrocarbon group having from 1 to 10 carbon atoms. Specific examples of the compound of the formula (1) include $C_6F_{13}C_2H_4OH$, $C_8F_{17}CH_2OH$, $C_{10}F_{21}C_2H_4OH$, $CHF_2(CF_2)_7CH_2OH$, $(CF_3)_2CF(CF_2)_3CH_2OH$, or $HCFhd 2(CF_2)_7CH_2OH$.

The ester containing a polyfluoroalkyl group may be an ester containing a polyfluoroalkyl group of the formula (2):

$$R_2.COO.R_6.R_3 \qquad (2)$$

wherein at least one of $R_2$ and $R_3$ is a polyfluoroalkyl group having from 4 to 20 carbon atoms, and the rest is a monovalent hydrocarbon group having from 1 to 20 carbon atoms, and $R_6$ is nil or a bivalent hydrocarbon group having from 1 to 20 carbon atoms.

Specific examples of the compound of the formula (2) include $C_6F_{13}COOC_{12}H_{25}$, $C_8F_{17}COOC_{18}H_{37}$, $C_6F_{13}C_2H_4OCOC_{11}H_{23}$, $C_8F_{17}CH_2OCOC_{17}H_{35}$, and $C_6F_{13}COOCH_2C_8F_{17}$.

The polyfluoroalkyl ester polymer of (meth)acrylic acid may be a homopolymer or copolymer of a polyfluoroalkyl ester of (meth)acrylic acid of the formula (3):

$$CH_2=C(R_4).COO.R_5Rf \qquad (3)$$

wherein Rf is a polyfluoroalkyl group having from 4 to 20 carbon atoms, $R_4$ is hydrogen or a methyl group, and $R_5$ is a bivalent hydrocarbon group having from 1 to 10 carbon atoms.

Specific examples of the compound of the formula (3) include $CF_3(CF_2)_4CH_2OCOC(CH_3)=CH_2$, $CF_3(CF_2)_6(CH_2)_2OCOC(CH_3)=CH_2$, $CF_3(CF_2)_7(CH_2)_2OCOCH=CH_2$, $CF_3CF_3CF(CF_2)_5(CH_2)_2OCOCH=CH_2$, $CF_3(CF_2)_8(CH_2)_2OCOCH=CH_2$, $CF_3(CF_2)_8(CH_2)_2OCOC(CH_3)=CH_2$, $CF_3(CF_2)_7SO_2N(C_3H_7)(CH_2)_2OCOCH=CH_2$, $CF_3(CF_2)_7(CH_2)_{40}COCH=CH_2$, $CF_3(CF_2)_7SO_2N(CH_3)(CH_2)_2OCOC(CH)=CH_2$, $CF_3(CF_2)_7SO_2N(C_2H_5)(CH_2)_2OCOCH=CH_2$, $CF_3(CF_2)_7CO_2NH(CH_2)_2OCOCH=CH_2$, and $CF_3CF_3CF(CF_2)_6(CH_2)_{30}COCH=CH_2$.

In the present invention, not only the homopolymer of a polyfluoroalkyl ester of (meth)acrylic acid of the formula (3) having a melting point of at most 100° C., but also a copolymer of such a monomer with a copolymerizable monomer, is also useful as a lubricant for skis. In the present invention, the copolymerizable monomer is not particularly limited so long as it is copolymerizable. However, a combination of different monomers of the formula (3), or a combination of a monomer of the formula (3) and a monomer selected from the following aliphatic acrylates and methacrylates, is preferred.

For example, (meth)acrylic acid alkyl ester monomers copolymerizable with polyfluoroalkyl esters of (meth)acrylic acid of the formula (3) include, as acrylates, a branched alkyl acrylate such as isobutyl acrylate, tert-butyl acrylate or 2-ethylhexylacrylate, a linear alkyl acrylate such as n-butyl acrylate, n-hexyl acrylate, n-octyl acrylate, lauryl acrylate, tridecyl acrylate or stearyl acrylate, and a cyclohexyl acrylate, and as methacrylates, like acrylates, a branched alkyl methacrylate such as isobutyl methacrylate, tert-butyl methacrylate or 2-ethylhexyl methacrylate, a linear alkyl methacrylate such as n-butyl methacrylate, n-hexyl methacrylate, n-octyl methacrylate, lauryl methacrylate, tridecyl methacrylate or stearyl methacrylate, and cyclohexyl methacrylate. For the copolymerization, one or more of the above-mentioned polymerizable monomers may be used at a desired proportion, for example, at a proportion of from 1 to 90% by weight. Needless to say, at the time of the copolymerization reaction, a molecular weight regulating agent such as mercaptan may be used to obtain a copolymer having a suitable melting point.

Such a fluorine compound having a melting point of at most 100° C. provides sliding properties superior to conventional paraffin waxes or polyfluoroalkanes, as proved by the Examples given hereinafter. This is believed to be attributable to the facts that the fluorine compound of the present invention strongly adheres to the ski soles, e.g. to the ski soles made of a high density polyethylene, particularly to the non-crystalline portion of the high density polyethylene, whereby the non-wettability is improved substantially over the conventional products, and the fluorine compound of the present invention can be coated at a low temperature, whereby heat degradation of the ski soles can be prevented.

When these fluorine compounds having a melting point of at most 100° C. are used in combination as a mixture, the respective fluorine compounds in the mixture may be in an amount selected within a range of from 1 to 99% by weight.

The lubricant for skis of the present invention may contain fluorinated graphite as an additional component in addition to the above described fluorine compound.

The fluorinated graphite of this type is a powder having high hardness, of which the basic structure is represented by the formula $CF_x$ wherein x is a number of from 0.5 to 1.0. This is commonly used as a solid lubricant, and its particle size is usually from 0.5 to 60 μm. For the lubricant for skis of the present invention, fluorinated graphite having a particle size of at most 10 μm is preferred. While being solid, fluorinated graphite has a low surface energy and high wettability to water. Also in this sense, fluorinated graphite is regarded as an important constituting component of the lubricant for skis in the present invention. The lubricant for skis of the present invention preferably comprises 100 parts by weight of the fluorine compound and from 5 to 100 parts by weight of the fluorinated graphite, in view of the effects. However, the proportions of the respective components are not so limited. The lubricant for skis of the present invention comprising the fluorine compound and the fluorinated graphite, is believed to provide excellent properties to the ski soles for the following reasons.

Namely, the fluorine compound component adheres to the ski soles, typically to the ski soles made of a high density polyethylene, particularly to the non-crystalline region of the high density polyethylene, whereby polyfluoroalkyl groups such as $CF_3$ having a low surface energy and high wettability to water are oriented at the outer most layer side of the lubricating surface. And, at this lubricating surface, the fluorine compound component and the fluorinated graphite component excellent in the chemical affinity are firmly held. Accordingly, at the lubricating surface, the non-wettability to water of the two components and the hardness-improving function of the fluorinated graphite are combined to provide excellent lubricating properties.

The paraffin wax is the one, the basic structure of which is represented by the formula $C_nH_{2n+2}$ and is usually a mixture of molecules with n being from 4 to 36. With respect to the peaks of the molecular weight distribution of the paraffin wax, there is one having a regular distribution having n=14–18 as the maximum peak (a single peak), or one wherein a plurality of peaks exist, for example, at n=16, 25 and 30. In any case such a paraffin wax has a function as a solid lubricant. Among them, there is one which is liquid at a snow temperature (from 0 to −5° C.) with n being not higher than 13, and such a paraffin wax is also excellent in the non-wettability to water and has a function as a liquid lubricant. In the present invention, any one of the above-mentioned paraffin waxes may be employed.

For the lubricant for skis of the present invention, the fluorine compound and the paraffin wax may be used in combination, and their proportions are preferably 100 parts by weight of the former and from 5 to 100 parts by weight of the latter, from the viewpoint of the effects and economy. However, the proportions are not so limited.

By the above combination, the drawback of the single use of the paraffin wax can be overcome, and excellent lubricating properties can be obtained. The reason may be explained as follows.

The adhesion of the lubricant to the ski soles, typically to the high density polyethylene, particularly to the non-crystalline portion of the high density polyethylene, is effective with a paraffin wax having a similar basic structure. Along with the adhesion of such a paraffin wax, the fluorine compound of the present invention adheres and is maintained together with the paraffin wax on the ski soles with the polyfluoroalkyl groups having a small surface energy, such as $CF_3$ groups, oriented at the outer most portion. In order to improve the lubricating properties of the lubricant for skis, the non-wettability to water may be improved. Since $CF_3$ groups or the like have a small surface energy, the adhered layer will be strengthened by such adhesion mode, and the non-wettability to water will also be improved.

In the lubricant for skis of the present invention, the paraffin wax exists among the fluorine compound, whereby the internal lubricating function is added by the paraffin wax. Accordingly, the lubricating layer on the ski soles provides stabilized lubricating properties. Particularly, the paraffin wax contains a component which is liquid even at a snow temperature, and by virtue of the function of the liquid lubricant, the lubricating surface provides stabilized lubricating properties.

For the lubricant for skis of the present invention, the paraffin wax and the fluorinated graphite may be used in combination, and the proportions are preferably from 50 to 95% by weight of the former and from 5 to 50% by weight of the latter, in view of the effects and economy. However, the proportions are not so limited.

By the above combination, the drawback of the single use of the paraffin wax component can be overcome, and excellent lubricating properties can be obtained. The reason may be explained as follows.

The adhesion of the lubricant to the ski soles, typically to the high density polyethylene, particularly to the non-crystalline portion thereof, proceeds preferentially and strongly with a paraffin wax having a similar basic structure. Then, on the adhered surface of this paraffin wax, fluorinated graphite having a small surface energy will be firmly held. In order to improve the lubricating properties of the lubricant for skis, the non-wettability to water may be improved. By the fluorinated graphite superior in the non-wettability to the paraffin wax, such properties will be enhanced. Further, the hardness of the lubricating surface will substantially be improved by the fluorinated graphite. In the present invention, the paraffin wax contains a component which is liquid at a snow temperature and has a function as a liquid lubricant, as mentioned above, and such a component serves as an internal lubricant for fluorinated graphite, whereby removal of the fluorinated graphite from the lubricating surface will be difficult, and stabilized lubricating properties will be obtained.

For the lubricant for skis of the present invention, the fluorine compound, the paraffin wax and the fluorinated graphite may be used in combination, and the proportions are preferably 100 parts by weight of the fluorine compound, from 5 to 100 parts by weight of the paraffin wax and from 5 to 100 parts by weight of the fluorinated graphite, from the viewpoint of the effects. However, the proportions are not so limited.

By the above combination, excellent properties can be provided to the ski soles. The reason may be explained as follows.

Namely, the adhesion to the ski soles, typically to the ski soles made of a high density polyethylene, particularly to the non-crystalline portion thereof, is effective with a paraffin wax having a similar basic structure. Along with the adhesion of this paraffin wax, the fluorine compound adheres and will be maintained together with the paraffin wax on the ski soles with polyfluoroalkyl groups having a small surface energy such as $CF_3$ groups oriented at the outer most portion. In order to improve the lubricating properties of the lubricant for skis, the non-wettability to water may be improved. Since $CF_3$ groups or the like have a small surface energy, the adhered layer will be enhanced by such an adhesion mode, and the non-wettability to water will also be improved.

Further, the fluorinated graphite constituting the lubricant for skis of the present invention, has an excellent chemical affinity to the fluorine compound, whereby it is firmly held on the lubricating surface and thus contributes to the improvement of the hardness of the lubricating surface. Further, in the present invention, the paraffin wax is also employed, the paraffin wax contains a component which is liquid at a snow temperature. Such a component provides a function as an internal lubricant for the fluorine compound and the fluorinated graphite, whereby the lubricant for skis of the present invention provides excellent lubricating properties.

As the polyfluoroalkane of the present invention, a polyfluoroalkane of the formula (4):

$$C_nF_{2n+2} \qquad (4)$$

wherein n is an integer of from 10 to 20, may be used.

Polyfluoroalkanes of this type are disclosed, for example, in Japanese Unexamined Patent Publication No. 58496/1985, and can be produced from halogenated perfluorocarbon sulfonyl ($C_nF_{2n+1}SO_2F$) as the starting material. In the formula (4), n is preferably from 10 to 20 in view of the application to skis and the lubricating properties.

In the present invention, the polyfluoroalkane of the formula (4) has no polar moiety such as a hydroxyl group or an ester residue in its molecule. Therefore, it is inferior to the fluorine compound in the adhesive property to the ski soles. But when the paraffin wax or the fluorinated graphite is combined thereto, it provides excellent lubricating properties and will be adequately practical. The proportion of the paraffin wax or the fluorinated graphite is preferably from 5 to 100 parts by weight per hour 100 parts by weight of the polyfluoroalkane, in view of the effects, etc. However, the proportions are not so limited.

The lubricant for skis of the present invention contains the above specific fluorine compound, the paraffin wax or the fluorinated graphite as an essential constituting component. Needless to say, conventional commonly employed additives may be incorporated thereto. Such additives include, for example, organic or inorganic super fine particles such as polyethylene, polytetrafluoroethylene, alumina or silica as an agent for controlling the hardness and the lubricating properties, super fine short fibers such as potassium titanite or silicon carbide, and plate-like substances such as graphite, talc or mica. In addition, a coloring agent such as a dye or a pigment, a lubricating agent such as a silicon compound, and an additive such as surfactant or an antioxidant, may be mentioned.

The lubricant for skis of the present invention may take an optional form such as a solid form or a liquid form.

For example, in the case of solid, the melting point in the lubricant for skis of the present invention is preferably at most 100° C. from the viewpoint of avoiding heat degradation of ski soles. However, the melting point is not so limited so long as it is solid at the time of use. The solid lubricant may be used by uniformly spreading it by means of a heat source such as an iron over the sliding surface of the skis.

Further, in the case of a liquid having the lubricant for skis of the present invention dissolved or dispersed in e.g. acetone, an alcohol or water, such a liquid may be coated on the ski sliding surface by e.g. a spray. Needless to say, also in the case of solid, the lubricant may be impregnated to paper, woven fabric, knitted fabric or non-woven fabric, and then coated on the soles.

Now, the present invention will be described in further detail with reference to Examples. However, it should be understood that the present invention is by no means restricted by such specific Examples.

EXAMPLES 1 TO 3 AND COMPARATIVE EXAMPLES 1 TO 3

(1) Lubricants for Skis

Table 1 shows the types of lubricants for skis used. The lubricants of Comparative Examples 1 and 2 are commercially available polyfluoroalkane type lubricants, and the lubricant of Comparative Example 3 is a commercially available hydrocarbon type paraffin wax.

In Table 1, the melting point was measured by means of DSC (calorimeter), and is the value measured from the DSC curve thereby obtained. (2) Conditions for Coating the Lubricants for Skis The lubricant for skis as identified in Table 1 was melted under heating and applied to the ski soles as waxing, and then uniformly spread with an iron having a surface temperature of 70° C.

Then, the coated skis were cooled at 10° C. for 8 hours and then scrubbed by a plastic scrubber until the coating surface of the lubricant for skis became flat. Further, the ski soles were smoothed by a nylon brush.

The fluoroalkane type lubricants of Comparative Examples 1 and 2 were melted under heating, then coated to ski soles and then uniformly spread by an iron adjusted to a surface temperature of 130° C. Thereafter, the ski soles were smoothed by a plastic scrubber and a nylon brush in the same manner as above. (3) Evaluation of the Performance of the Lubricants for Skis The skis coated as described above were actually used for sliding, and the performance was evaluated.

The sliding conditions were as follows.

| Weather: | Cloudy |
| --- | --- |
| Snow Temperature: | $-2°$ C. |
| Quality of Snow: | Frozen ski slope |
| Test course: | Straight 330 m |
| Average angle of the slope: | 25° |
| Runners: | Two skiers |

The evaluation of the performance of the lubricant for skis was conducted with respect to the initial speed and the average speed, and the average value of five runs was adopted.

The results are shown in Table 2.

TABLE 1

Lubricants for Skis

| Example No. | | Melting point (°C.) |
| --- | --- | --- |
| Example 1 | $C_7F_{15}COOC_{18}H_{37}$ | 36 |
| Example 2 | $C_8F_{17}C_2H_4OH$ | 50 |
| Example 3 | $C_8F_{17}C_2H_4OCOCH=CH_2/$ $C_{13}H_{37}OC(CH_3)=CH_2$ Copolymer of 40 wt %/60 wt % | 52 |
| Comparative Example 1 | 1:1 mixture of $C_{14}F_{30}$ and $C_{16}F_{34}$ | 110 |
| Comparative Example 2 | Mixture of $C_{16}F_{34}$, $C_{18}F_{38}$ and $C_{20}F_{42}$ | 120 |
| Comparative Example 3 | Commercially available hydrocarbon type paraffin wax | 55 |

TABLE 2

Evaluation of Performance

| Example No. | Initial Speed (km/hr) | Average Speed (km/hr) |
| --- | --- | --- |
| Example 1 | 64.52 | 83.51 |
| Example 2 | 62.65 | 82.45 |
| Example 3 | 63.12 | 80.57 |
| Comparative Example 1 | 61.38 | 78.02 |
| Comparative Example 2 | 60.59 | 76.42 |
| Comparative Example 3 | 60.03 | 75.88 |

EXAMPLES 4 TO 7 AND COMPARATIVE EXAMPLES 4 TO 9

(1) Lubricants for Skis

Table 3 shows the types of the lubricants for skis used.

(2) Conditions for the coating the Lubricants for Skis

The lubricant for skis as identified in Table 3 was melted under heating and coated on the ski soles as waxing, and then uniformly spread by an iron.

Then, the coated skis were cooled at 10° C. for 8 hours, and then scrubbed by a plastic scrubber until the coating surface of the lubricant for skis became flat. Further, the ski soles were smoothed by a nylon brush.

(3) Evaluation of the Performance of the Lubricants for Skis

The skis coated as described above were actually used for sliding, and the performance was evaluated.

The sliding conditions were as follows.

| Weather: | Cloudy |
| --- | --- |
| Snow Temperature: | $-5°$ C. |
| Quality of Snow: | Frozen ski slope |
| Test course: | Straight 200 m |
| Average angle of the slope: | 23° |
| Runners: | Two skiers |

The evaluation of the performance of the lubricant for skis were conducted with respect to the initial speed and the average speed, and the average value of five runs was adopted. The results are shown in Table 3.

TABLE 3

(Parts by weight)

| | Example 4 | Example 5 | Example 6 | Example 7 | Comparative Example 4 | Comparative Example 5 | Comparative Example 6 | Comparative Example 7 | Comparative Example 8 | Comparative Example 9 |
|---|---|---|---|---|---|---|---|---|---|---|
| Lubricants for Skis | | | | | | | | | | |
| $C_7F_{15}COOC_{18}H_{37}$ | 100 | | | 50 | 100 | | | | | |
| $C_8F_{17}C_2H_4OH$ | | 100 | | | | 100 | | | | |
| $C_8F_{17}C_2H_4OCOCH=CH_2/$ $C_{13}H_{37}OC(CH_3)=CH_2$ Copolymer of 40 wt %/60 wt % | | | 100 | 50 | | | 100 | | | |
| Mixture of $C_{16}F_{34}$, $C_{18}F_{38}$ and $C_{20}F_{42}$ | | | | | | | | 100 | | 100 |
| Paraffin wax (m.p. 55° C.) | 30 | 30 | 30 | 30 | | | | | 100 | 30 |
| Evaluation of Performance | | | | | | | | | | |
| Initial Speed (km/hr) | 62.57 | 61.74 | 61.32 | 62.24 | 61.25 | 61.30 | 61.23 | 60.43 | 60.03 | 61.31 |
| Average Speed (km/hr) | 81.73 | 80.86 | 80.31 | 81.64 | 79.28 | 79.18 | 79.87 | 76.21 | 78.76 | 77.31 |

EXAMPLES 8 TO 10 AND COMPARATIVE EXAMPLES 10 TO 13

TABLE 4

(Parts by weight)

| | Example 8 | Example 9 | Example 10 | Comparative Example 10 | Comparative Example 11 | Comparative Example 12 | Comparative Example 13 |
|---|---|---|---|---|---|---|---|
| Lubricants for Skis | | | | | | | |
| Paraffin wax (m.p. 55° C.) | 50 | 70 | 90 | 100 | | | 30 |
| Fluorinated graphite | 50 | 30 | 10 | | | | |
| Mixture of $C_{16}F_{34}$ and $C_{18}F_{38}$ | | | | | 100 | | |
| Mixture of $C_{16}F_{34}$, $C_{18}F_{38}$ and $C_{20}F_{42}$ | | | | | | 100 | 100 |
| Evaluation of Performance | | | | | | | |
| Initial Speed (km/hr) | 62.60 | 62.91 | 63.38 | 60.03 | 60.11 | 60.43 | 61.31 |
| Average Speed (km/hr) | 81.15 | 82.05 | 81.92 | 78.76 | 76.45 | 76.21 | 77.31 |

(1) Lubricants for Skis

Table 4 shows the types of the lubricants for skis used. The paraffin wax used was the one manufactured by ToKo Company, and the fluorinated graphite was the one manufactured by Asahi Glass Company Ltd. and had a particle size of 0.2 μm.

(2) Conditions for coating the Lubricants for Skis

The lubricant for skis as identified in Table 4 was melted under heating and coated on the ski soles as waxing, and then uniformly spread by an iron.

Then, the coated skis were cooled as at 10° C. for 8 hours, and then scrubbed by a plastic scrubber until the coating surface of the lubricant for skis became flat. Further, the ski soles were smoothed by a nylon brush.

(3) Evaluation of the Performance of the Lubricants for Skis

The skis coated as described above were actually used for sliding, and the performance was evaluated.

The sliding conditions were as follows.

| | |
|---|---|
| Weather: | Cloudy |
| Snow Temperature: | −5° C. |
| Quality of Snow: | Frozen ski slope |
| Test course: | Straight 200 m |
| Average angle of the slope: | 23° |
| Runners: | Two skiers |

The evaluation of the performance of the lubricant for skis were conducted with respect to the initial speed and the average speed, and the average value of five runs was adopted.

The results are shown in Table 4.

EXAMPLES 11 TO 14 AND COMPARATIVE EXAMPLES 14 TO 18

(1) Lubricants for Skis

Table 5 shows the types of the lubricants for skis used. The fluorinated graphite used was the one manufactured by Asahi Glass Company Ltd. and had a particle size of 0.2 μm.

(2) Conditions for coating the Lubricants for Skis

The lubricant for skis as identified in Table 5 was melted under heating and coated on the ski soles as waxing, and then uniformly spread by an iron.

Then, the coated skis were cooled as at 10° C. for 8 hours, and then scrubbed by a plastic scrubber until the coating surface of the lubricant for skis became flat. Further, the ski soles were smoothed by a nylon brush.

(3) Evaluation of the Performance of the Lubricants for Skis

The skis coated as described above were actually used for sliding, and the performance was evaluated.

The sliding conditions were as follows.

| | |
|---|---|
| Weather: | Cloudy |
| Snow Temperature: | −5° C. |
| Quality of Snow: | Frozen ski slope |
| Test course: | Straight 200 m |
| Average angle of the slope: | 23° |
| Runners: | Two skiers |

The evaluation of the performance of the lubricant for skis were conducted with respect to the initial speed and the average speed, and the average value of five runs was adopted.

The results are shown in Table 5.

| Weather: | Cloudy |
|---|---|
| Snow Temperature: | $-5°$ C. |
| Quality of Snow: | Frozen ski slope |
| Test course: | Straight 200 m |

TABLE 5

(Parts by weight)

| | Example/Comparative Example | | | | | | | | |
|---|---|---|---|---|---|---|---|---|---|
| | Example 11 | Example 12 | Example 13 | Example 14 | Comparative Example 14 | Comparative Example 15 | Comparative Example 16 | Comparative Example 17 | Comparative Example 18 |
| Lubricants for Skis | | | | | | | | | |
| $C_7F_{15}COOC_{18}H_{37}$ | 100 | | | 100 | | | | 30 | |
| $C_8F_{17}C_2H_4OH$ | | 100 | | | 100 | | | | |
| $C_8F_{17}C_2H_4OCOCH=CH_2/$ $C_{13}H_{37}OC(CH_3)=CH_2$ Copolymer of 40 wt %/60 wt % | | | 100 | | | | 100 | | |
| Mixture of $C_{16}F_{34}$, $C_{18}F_{38}$ and $C_{20}F_{42}$ | | | | 100 | | | | 100 | |
| Paraffin wax (m.p. 55° C.) | | | | | | | | | 100 |
| Fluorinated graphite | 10 | 10 | 10 | 10 | — | — | — | — | — |
| Evaluation of Performance | | | | | | | | | |
| Initial Speed (km/hr) | 64.81 | 62.71 | 63.97 | 62.24 | 61.25 | 61.30 | 61.23 | 60.43 | 60.03 |
| Average Speed (km/hr) | 84.21 | 83.02 | 82.11 | 81.03 | 79.28 | 79.18 | 79.87 | 76.21 | 78.76 |

EXAMPLES 15 to 18 AND COMPARATIVE EXAMPLES 19 to 24

(1) Lubricants for Skis

Table 4 shows the types of the lubricants for skis used. The paraffin wax used was the one manufactured by ToKo Company, and the fluorinated graphite was the one manufactured by Asahi Glass Company Ltd. and had a particle size of 0.2 μm.

(2) Conditions for coating the Lubricants for Skis

The lubricant for skis as identified in Table 6 was melted under heating and coated on the ski soles as waxing, and then uniformly spread by an iron.

Then, the coated skis were cooled as at 10° C. for 8 hours, and then scrubbed by a plastic scrubber until the coating surface of the lubricant for skis became flat. Further, the ski soles were smoothed by a nylon brush.

(3) Evaluation of the Performance of the Lubricants for Skis

The skis coated as described above were actually used for sliding, and the performance was evaluated.

The sliding conditions were as follows.

| Average angle of the slope: | 23° |
|---|---|
| Runners: | Two skiers |

The evaluation of the performance of the lubricant for skis were conducted with respect to the initial speed and the average speed, and the average value of five runs was adopted.

The results are shown in Table 6.

TABLE 6

(Parts by weight)

| | Example/Comparative Example | | | | | | | | |
|---|---|---|---|---|---|---|---|---|---|
| | Example 15 | Example 16 | Example 17 | Example 18 | Comparative Example 19 | Comparative Example 20 | Comparative Example 21 | Comparative Example 22 | Comparative Example 23 |
| Lubricants for Skis | | | | | | | | | |
| $C_7F_{15}COOC_{18}H_{37}$ | 100 | | | | 100 | | | | |
| $C_8F_{17}C_2H_4OH$ | | 100 | | | | 100 | | | |
| $C_8F_{17}C_2H_4OCOCH=CH_2/$ $C_{13}H_{37}OC(CH_3)=CH_2$ Copolymer of 40 wt %/60 wt % | | | 100 | | | | 100 | | |
| Mixture of $C_{16}F_{34}$, $C_{18}F_{38}$ and $C_{20}F_{42}$ | | | | 100 | | | | 100 | |
| Paraffin wax (m.p. 55° C.) | 30 | 30 | 30 | 30 | — | — | — | — | 100 |
| Fluorinated graphite | 10 | 10 | 10 | 10 | — | — | — | — | — |
| Initial Speed (km/hr) | 64.80 | 62.88 | 64.07 | 62.65 | 61.25 | 61.30 | 61.23 | 60.43 | 60.03 |
| Average Speed (km/hr) | 84.33 | 84.82 | 82.34 | 81.09 | 79.28 | 79.18 | 79.87 | 76.21 | 78.76 |

The lubricant for skis of the present invention contains a specific fluorine compound, paraffin wax or fluorinated graphite as the essential component, and the sliding surface is excellent in the non-wettability to water, and the lubricant is capable of firmly adhering to the ski soles and forming a lubricating surface excellent in the hardness.

The lubricant for skis of the present invention has sliding properties which are hardly obtainable by conventional lubricants for skis and is excellent in the initial speed and the average speed. As a result, it provides good results in an alpen competition where the skiers compete for 1/100 second. Further, since the hardness of the lubricating surface is excellent, consistent lubricating properties are provided against hard snow. Further, excellent lubricating properties can be maintained in the course for alpen competition from the starting point where the snow temperature is low to the goal where the snow temperature is relatively mild.

We claim:

1. A ski having upon its sole a lubricant, which comprises a fluorine compound containing a polyfluoroalkyl group and having a melting point of at most 100° C., wherein the fluorine compound is at least one member selected from the group consisting of:

(a) an alcohol containing a polyfluoroalkyl group of the formula (1)

$$Rf.R_1.OH \qquad (1)$$

wherein Rf is a polyfluoroalkyl group having from 4 to 20 carbon atoms, and $R_1$ is a bivalent hydrocarbon group having from 1 to 10 carbon atoms, (b) an ester containing a polyfluoroalkyl group of the formula (2):

$$R_2.COO.R_6.R_3 \qquad (2)$$

wherein at least one of $R_2$ and $R_3$ is a polyfluoroalkyl group having from 4 to 20 carbon atoms, and the rest is a monovalent hydrocarbon group having from 1 to 20 carbon atoms, and $R_6$ is nil or a bivalent hydrocarbon group having from 1 to 20 carbon atoms, and (c) a homopolymer of copolymer of a polyfluoroalkyl ester of (meth)acrylic acid or the formula (3):

$$CH_2=C(R_4).COO.R_5Rf \qquad (3)$$

wherein Rf is a polyfluoroalkyl group having from 4 to 20 carbon atoms, $R_4$ is hydrogen or a methyl group, and $R_5$ is a bivalent hydrocarbon group having from 1 to 10 carbon atoms.

2. The ski according to claim 1, wherein the alcohol containing the polyfluoroalkyl group is an alcohol of the formula (1):

$$Rf.R_1.OH \qquad (1)$$

wherein Rf is a polyfluoroalkyl group having from 4 to 20 carbon atoms, and $R_1$ is a bivalent hydrocarbon group having from 1 to 10 carbon atoms.

3. The ski according to claim 1, wherein the ester containing a polyfluoroalkyl group is an ester of the formula (2):

$$R_2.COO.R_6.R_3 \qquad (2)$$

wherein at least one of $R_2$ and $R_3$ is a polyfluoroalkyl group having from 4 to 20 carbon atoms, and the rest is a monovalent hydrocarbon group having from 1 to 20 carbon atoms, and $R_6$ is nil or a bivalent hydrocarbon group having from 1 to 20 carbon atoms.

4. The ski according to claim 1, wherein the polyfluoroalkyl ester polymer of (meth)acrylic acid is a homopolymer or copolymer of a polyfluoroalkyl ester of (meth)acrylic acid of the formula (3):

$$CH_2=C(R_4).COO.R_5Rf \qquad (3)$$

wherein Rf is a polyfluoroalkyl group having from 4 to 20 carbon atoms, $R_4$ is hydrogen or a methyl group, and $R_5$ is a bivalent hydrocarbon group having from 1 to 10 carbon atoms.

5. The ski according to claim 4, wherein the polyfluoroalkyl ester polymer of (meth)acrylic acid is a copolymer of a polyfluoroalkyl ester of (meth) acrylic acid of the formula (3) with an alkyl ester of (meth)acrylic acid.

6. A lubricant for skis, which comprises a fluorine compound containing a polyfluoroalkyl group and having a melting point of at most 100° C., wherein the fluorine compound is at least one member selected from the group consisting of:

(a) an alcohol containing a polyfluoroalkyl group of the formula (1):

$$Rf.R_1.OH \qquad (1)$$

wherein Rf is a polyfluoroalkyl group having from 4 to 20 carbon atoms, and $R_1$ is a bivalent hydrocarbon group having from 1 to 10 carbon atoms, (b) an ester containing a polyfluoroalkyl group of the formula (2):

$$R_2.COO.R_6.R_3 \qquad (2)$$

wherein at least one of $R_2$ and $R_3$ is a polyfluoroalkyl group having from 4 to 20 carbon atoms, and the rest is a monovalent hydrocarbon group having from 1 to 20 carbon atoms, and $R_6$ is nil or a bivalent hydrocarbon group having from 1 to 20 carbon atoms, and (c) a homopolymer or copolymer of a polyfluoroalkyl ester of (meth)acrylic acid or the formula (3):

$$CH_2=C(R_4).COO.R_5Rf \qquad (3)$$

wherein Rf is a polyfluoroalkyl group having from 4 to 20 carbon atoms, $R_4$ is hydrogen or a methyl group, and $R_5$ is a bivalent hydrocarbon group having from 1 to 10 carbon atoms, wherein the fluorine compound having a melting point of at most 100° C. contains fluorinated graphite.

7. A lubricant for skis, which comprises a fluorine compound containing a polyfluoroalkyl group and having a melting point of at most 100° C., wherein the fluorine compound is at least one member selected from the group consisting of:

(a) an alcohol containing a polyfluoroalkyl group of the formula (1):

$$Rf.R_1.OH \qquad (1)$$

wherein Rf is a polyfluoroalkyl group having from 4 to 20 carbon atoms, and $R_1$ is a bivalent hydrocarbon group having from 1 to 10 carbon atoms, (b) an ester containing a polyfluoroalkyl group of the formula (2):

$$R_2.COO.R_6.R_3 \qquad (2)$$

wherein at least one of $R_2$ and $R_3$ is a polyfluoroalkyl group having from 4 to 20 carbon atoms, and the rest is a monovalent hydrocarbon group having from 1 to 20 carbon atoms, and $R_6$ is nil or a bivalent hydrocarbon group having from 1 to 20 carbon atoms, and (c) a homopolymer or copolymer of a polyfluoroalkyl ester of (meth)acrylic acid or the formula (3):

$$CH_2=C(R_4).COO.R_5Rf \quad (3)$$

wherein Rf is a polyfluoroalkyl group having from 4 to 20 carbon atoms, $R_4$ is hydrogen or a methyl group, and $R_5$ is a bivalent hydrocarbon group having from 1 to 10 carbon atoms, and at least one member selected from the group consisting of paraffin wax and a polyfluoroalkane of the formula (4):

$$C_nF_{2n+2} \quad (4)$$

wherein n is an integer of from 10 to 20.

8. The lubricant for skis according to claim 7, wherein the alcohol containing a polyfluoroalkyl group is an alcohol of the formula (1):

$$Rf.R_1.OH \quad (1)$$

wherein Rf is a polyfluoroalkyl group having from 4 to 20 carbon atoms, and $R_1$ is a bivalent hydrocarbon group having from 1 to 10 carbon atoms.

9. The lubricant for skis according to claim 7, wherein the ester containing a polyfluoroalkyl group is an ester of the formula (2):

$$R_2.COO.R_6.R_3 \quad (2)$$

wherein at least one of $R_2$ and $R_3$ is a polyfluoroalkyl group having from 4 to 20 carbon atoms, and the rest is a monovalent hydrocarbon group having from 1 to 20 carbon atoms, and $R_6$ is nil or a bivalent hydrocarbon group having from 1 to 20 carbon atoms.

10. The lubricant for skis according to claim 7, wherein the (meth)acrylic acid ester polymer containing a polyfluroalkyl group is a homopolymer or copolymer of a polyfluoroalkyl ester of (meth)acrylic acid of the formula (3):

$$CH_2=C(R_4).COO.R_5Rf \quad (3)$$

wherein Rf is a polyfluoroalkyl group having from 4 to 20 carbon atoms, $R_4$ is hydrogen or a methyl group, and $R_5$ is a bivalent hydrocarbon group having from 1 to 10 carbon atoms.

11. The lubricant for skis according to claim 10, wherein the (meth)acrylic acid ester polymer containing a polyfluoroalkyl group is a copolymer of a polyfluoroalkyl ester of (meth)acrylic acid of the formula (3) with an alkylester of (meth)acrylic acid.

12. The lubricant for skis according to claim 7, wherein with respect to the blend proportions of the fluorine compound (i) and the paraffin wax/the polyfluoroalkane (ii), component (i) is 100 parts by weight, and component (ii) is from 5 to 100 parts by weight.

* * * * *